March 10, 1970     G. K. NUTZ     3,500,049
VARIABLE ALBEDO EARTH SENSOR OF A RELATIVELY NARROW ANGULAR
EFFECTIVE FIELD OF VIEW Filed April 17, 1967     5 Sheets-Sheet 1

INVENTOR.
GEORGE K. NUTZ
BY *Herbert L. Harris*

ATTORNEY

INVENTOR.
GEORGE K. NUTZ
BY
ATTORNEY

INVENTOR.
GEORGE K. NUTZ
BY
ATTORNEY

# United States Patent Office 3,500,049
Patented Mar. 10, 1970

3,500,049
VARIABLE ALBEDO EARTH SENSOR OF A RELATIVELY NARROW ANGULAR EFFECTIVE FIELD OF VIEW
George Kaspar Nutz, Hasbrouck Heights, N.J., assignor to The Bendix Corporation, a corporation of Delaware
Filed Apr. 17, 1967, Ser. No. 631,469
Int. Cl. H01j 39/12
U.S. Cl. 250—209
12 Claims

ABSTRACT OF THE DISCLOSURE

A variable albedo earth sensor having a relatively narrow field of view so as to be operative within specific angular tolerances to a wide variation of incoming light intensity and less sensitive to earth albedo area variations caused by eclipsing and relatively insensitive to temperature variations over a wide operating range. This is accomplished by incorporating in the sensor a relatively short focal length lens, together with a focal plane stop to increase the sensitivity of the device to a predetermined critical angle of the incoming albedo light rays, while other light stops are provided to limit the exposed photovoltiac cell areas that may be subject to the incoming light rays so as to balance the energy densities impinging on the three voltaic cells and increase the sensitivity of the device to the criticality of the angle of the incoming. light rays.

CROSS-REFERENCE TO RELATED APPLICATIONS

This application relates to improvements in an earth albedo sensor of a type such as disclosed and claimed in a U.S. application Ser. No. 572,775, filed Aug. 16, 1966, by Alfred E. Eckermann and assigned to The Bendix Corporation, assignee of the present invention.

BACKGROUND OF THE INVENTION

Field of the invention

A variable albedo earth sensor having a relatively narrow field of view for use on earth orbiting satellites and space vehicles to sense a critical angle of the incoming reflected sunlight from the earth under varying light intensity conditions so as to initiate the closing of a shutter to protect a star tracker photomultiplier tube from damage that might otherwise result from direct earth illumination.

Description of the prior art

The invention relates to improvements in an albedo earth sensor such as disclosed and claimed in the U.S. application Ser. No. 572,775. Such prior earth albedo sensor operates on a distinctly different principle in that the sensing action thereof, while theoretically controlled by the angle of the incoming light rays, and inherently dependent on the intensity of the reflective earth light rays, the operation of such prior device is predicated upon a relatively constant earth albedo (coefficient of reflectance). In the prior device, the current output of the photovoltaic cells changes with variations in the surface areas of the cells exposed to the light rays, due to the changes in the angle of the incoming light rays, so as to effect at the calibrated earth albedo a triggering voltage at the critical angle of the incoming light rays. Such prior earth sensors may initiate the closing of a shutter, to protect a photomultiplier tube from damage, when the angle of the optical axis to the earth's zenith is at a predetermined angular relation at the sense constant earth albedo. Under actual operating conditions, however, the earth's albedo may vary in intensity from, for example, .1 to .85, so that where, as in the prior earth albedo sensor, the operation thereof is predicated upon a predetermined light intensity, variations in such intensity over such a wide range would seriously affect the trigger angle at which the prior sensor device would be brought under effective operation.

Thus, under relatively low illumination conditions a sensor would not function to initiate the closing of the shutter to protect the star tracker photomultiplier tube from direct earth illumination, as required, while under relatively high illumination conditions the light intensity would not provide a proper indicia of the critical angle at which the shutter should be closed.

In the present invention, it is recognized that photovoltaic cells generate voltage as a function of illumination of the cells while current is generated by the cells as a function of the area of the cell illumination.

As distinguished then from the prior light sensor of the aforenoted U.S. application Ser. No. 572,775, the variable albedo earth sensor of the present invention responds to an off-on illumination of limited edge portions of the cells at the critical angle of the incoming albedo light rays within the specific angular tolerances to effect a sharply responsive triggering voltage rather than to a relatively wide varying surface area of the cells to effect a current output which varies with the surface area opposed to the incoming light rays to provide a triggering effect. The current generating effect of the variations in the surface areas of the photovoltaic cells of such prior sensor devices changes markedly not only with the area of the exposed surface, but also with the intensity of the earth albedo, as well as with changes in the prevailing ambient temperature.

SUMMARY OF THE INVENTION

The invention contemplates the provision of an optical sensor for use in conjunction with an earth satellite tracking telescope which may be carried by the space vehicle at an altitude above the earth's surface of approximately one hundred to several thousand miles and which senses the critical angle of the incoming light rays as reflected by the earth so as to effect operation of the shutter to protect the telescope from direct earth illumination and which sensor operates on an off-on voltage generative principle which is relatively insensitive to changes in the intensity of the earth albedo rays, as well as relatively insensitive to changes in the prevailing ambient temperature.

Another object of the invention is to provide an improved light sensing device, including a relatively short focal length lens, first and second apertured photovoltaic cells, and a non-apertured third photovoltaic cell in a spaced relationship along a common central axis within a tubular housing, together with a pair of apertured light stops positioned in spaced relationship along the common axis with the first of said stops being positioned immediately between the first cell and the lens, and the second of said stops being positioned between the first and second cells and at the focal length of the lens so as to provide a focal plane stop which acts as a light energy off-on switch to the second and third cells at the critical light angle to effect a triggering voltage.

Another object of the invention is to provide such a light sensing device so arranged on an earth orbiting satellite that as the satellite turns toward the earth decreasing the angle between the optical axis of the device and a tangential line to the earth, the reflected light from the earth becomes incident on a first photovoltaic cell resulting in a voltage output of one polarity and thereafter as the angle of the light rays further decrease the light rays at the focal point of the lens pass through the aperture in the second stop at the focal plane so as to diverge onto a limited edge portion of the second photovoltaic cell and on to the third non-apertured photovoltaic cell, the second and third cells thereupon providing voltage outputs of a polarity opposite to that of the voltage output from the first photovoltaic cell, and in which light sensing device the reflected light from the earth in passing through the relatively short focal length lens and the aperture of the second light stop at the focal plane of the lens is diverged thereat so as to also strike the third photovoltaic cell effecting voltage output acting in additive relation to the voltage output of the second photovoltaic cell, the voltage output of the second photovoltaic cell being applied through a balancing resistor in opposing relation to the voltage output from the first cell, so as to counterbalance the opposing voltage and render the third photovoltaic cell effective in response to the diverging light rays applied thereto to provide a rapid increase in the voltage output of the light sensing device of latter polarity for effecting a switching operation.

Another object of the invention is to provide an improved light angle sensing device utilizing a plurality of light stops having apertures of equal diameter for effecting an off-on illumination of limited portions of photovoltaic cells for effecting a control function.

Another object of the invention is to provide an improved light angle sensing device utilizing in addition to a relatively short focal length lens a focal plane stop positioned intermediate the lens and a controlling photovoltaic cell and at the focal point of the lens to cause the sensed light rays to diverge at the focal point of the lens for increasing the effect of the light rays as applied through the focal plane stop on the light sensing photovoltaic cell in a light energy off-on switching action.

Another object of the invention is to provide a novel light sensing device in which there is utilized as the light sensing elements thereof photovoltaic cells selectively rendered effective by a pair of serially arranged light stops to render the cells effective in a light energy off-on switching action.

Another object of the invention is to provide a light sensing device having a relatively narrow angular field of view and operative on a space vehicle which may orbit the earth at an altitude of at least 100 miles and acting in conjunction with a star tracking telescope carried by the space vehicle to specifically control under varying albedo (coefficient of reflectance) conditions a triggering circuit for a relay to close a light shutter on the telescope, and thereby prevent under such albedo conditions damage to the sensitive light collecting elements of the telescope in the event the field of view of the telescope should happen to include a predetermined angle of reflected light rays from the earth.

Another object of the invention is to provide an improved light sensing device having an optical axis aligned on the space vehicle with the optical axis of the star tracking telescope so as to be capable of detecting the earth's albedo, and effective under widely varying albedo (coefficient of reflectance) conditions to deliver a control signal when the optical axis of the light sensing device and corresponding optical axis of the star tracking telescope is pointing within a predetermined unsafe angular range of a line extending tangent to the horizon of the earth.

Another object of the invention is to provide such an improved light sensing device having a trigger control circuit including a plurality of photovoltaic cells and a balancing resistor serially connecting output voltages from the first and second cells therethrough in opposing relation, so that upon a stop controlled light ray striking the third cell the control circuit of the light sensitive device may be rendered effective to provide an output voltage to cause a trigger circuit to actuate a light shield or shutter for the star tracking telescope so as to prevent damage to the light sensitive elements of the telescope.

The invention contemplates as another object thereof the provision of a novel light sensing device, including a short focal length light lens in lieu of the standard optical window concept of the device of the prior application Ser. No. 572,775, together with a focal plane stop which is effective to increase the device sensitivity to the critical angle of incoming albedo light rays, together with other light stops so arranged as to restrict the exposed surface areas of the photovoltaic cells so as to effect balanced energy densities impinging on the areas of the controlling photovoltaic cells.

Another object of the invention is to provide such a light sensing device in which the lens is so arranged in relation to the several light stops as to provide a focal length shorter than the physical length of the sensor and with a focal plane stop positioned at a point intermediate the opposite ends of the sensor and at the focal point of the lens and in a cooperative relation to a pair of photovoltaic cells providing a voltage output acting in opposition to a voltage output from another photovoltaic cell positioned in a preceding relation to the focal plane stop. The succeeding pair of photovoltaic cells being positioned in spaced relation at a greater distance from the lens than the focal plane stop and at a shorter distance than the physical length of the sensor so that the focal plane stop serves as an off-on light switch to such pair of photovoltaic cells to effect an off-on control of the illumination thereof dependent upon the critical angle of the incoming albedo light rays.

The invention further contemplates a variable albedo earth sensor including a housing, a relatively short focal length lens mounted in an opening at one end of the housing and arranged to increase the cell light intensity controlling the operation of the three voltaic cells mounted within the housing, together with two apertured stops arranged in spaced relation within the housing so as to effectively control the application of the incoming light rays to the three voltaic cells, and a balance resistor operatively connected in an electrical network with the voltaic cells, the arrangement being such that the incoming light rays entering through the lens in the open end of the housing are effectively controlled by a positive light stop which serves to limit the effective area of a first voltaic cell exposed to the incoming light rays so as to reduce the capability of the first cell to vary the sensor output with variations in the illumination or area of illumination. The remaining light rays converge at its focal point in the plane of focal plane light stop, so that the light rays there diverge onto second and third photovoltaic cells positioned in spaced relation within the housing at points exceeding the focal length of the lens. The arrangement is such that light entering the lens at a relatively large angle is prohibited from impinging on the voltaic cells by the positive light stop so that the stop functions to limit the exposed area of the first of the voltaic cells to reduce its current generating capability varying with the intensity of illumination while developing the voltage generating capability of the respective cells as a sharply responsive function to the off-on illumination thereof.

Another object of the invention is to provide a novel angle light sensing device utilizing a lens having a relatively short focal length to increase the controlling cell light intensity and including critical light stops to control the application of the incoming light rays to a plurality of voltaic cells with the light stops being so arranged as to increase the rapidity of the light transfer at a critical angle and the sensitivity of the device with variations in the angle of the incoming light rays about the critical angle.

Another object of the invention is to provide such a critical angle light sensing device having balanced photovoltaic cell outputs to minimize output changes caused by a varying earth albedo intensity, as well as minimize output changes upon ambient temperature variations.

Another object of the invention is to provide in such a novel light sensing device, a plurality of photovoltaic cells so arranged that the controlling action thereof is dependent not upon variations in the area of exposure of the photovoltaic cells, but rather upon a critical off-on illumination thereof, effected through the provision of critical light stops providing the off-on action dependent upon the incoming light ray striking a limited exposed portion of the cells, so as to in effect generate a maximum voltage with the off-on exposure of such portion to illumination thereof.

Another object of the invention is to provide in such a novel light sensing device a photovoltaic cell arrangement which is relatively temperature insensitive, since the voltage generated is not a function of the cell areas illuminated, but rather upon the instant exposure of the limited area provided to illumination by the incoming light rays so that by so decreasing the current generating function of the photovoltaic cells the same are effectively made somewhat more insensitive to variations in the ambient temperature than prior arrangements in which the controlling action is dependent upon variations in the area of exposure of the photovoltaic cells to utilize the current generating function of the photovoltaic controlling cells in effecting the controlling action of such prior devices.

These and other objects and features of the invention are pointed out in the following description in terms of the embodiment thereof which is shown in the accompanying drawings. It is to be understood, however, that the drawings are for the purpose of illustration only and are not a definition of the limits of the invention reference being had to the appended claims for this purpose.

DESCRIPTION OF THE DRAWINGS

In the drawings corresponding numerals indicate corresponding parts in the several views.

Figure 8:
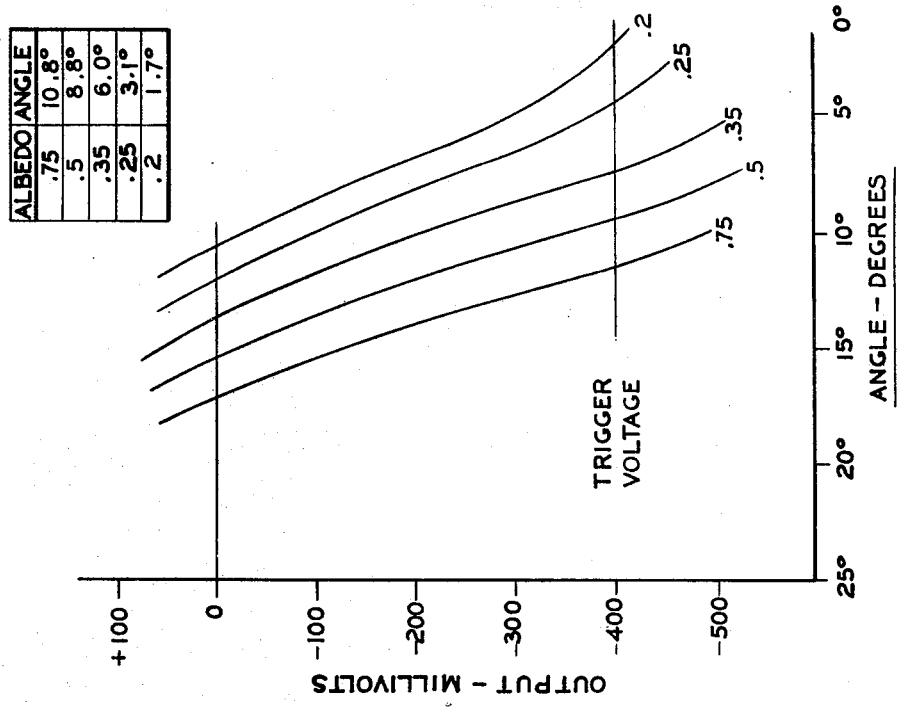
FIGURE 8 is a graphical illustration of the trigger voltage effected by the prior type light sensor in which the current output is varied with the surface area of illumination of the controlling photovoltaic cells and illustrating that in such type light sensor the critical trigger angle varies greatly by as much as a 9.1 degree change with variation in the intensity of the earth albedo (coefficient of reflectance) over the range of from .2 to .75.
Figure 7:
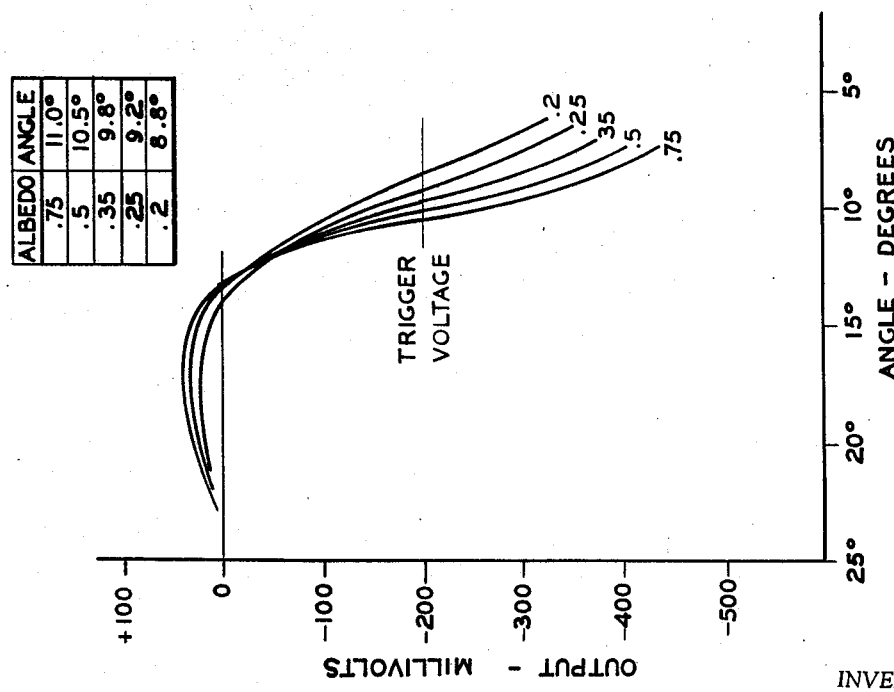
FIGURE 7 is a graphical illustration of the shifts in the voltage output of the light sensing device of FIGURES 1-2 and 4-6 upon the optical axis thereof being positioned at the inicated angles to a line extending tangent to the horizon of the earth and showing that the critical trigger angle varies only slightly by, for example, only 2.2 degrees over a wide range range of change in the earth albedo (coefficient of reflectance) of from .2 to .75.

The advantages of the variable albedo sensor of the present invention is readily apparent from a comparison of the graphs of FIGURES 7 and 8 when it is borne in mind that, as shown by the graph of FIGURE 7, there is a change in the sensed critical angle of the light rays of only 2.2 degrees over the range of variations in the intensity of the earth albedo (coefficient of reflectance) of from .2 to .75 albedo, while in the prior type device the change in the sensed critical angle of the light rays may vary by as much as 9.1 degrees over the same range of variation in the intensity of the earth albedo.

Figures 9, 10:
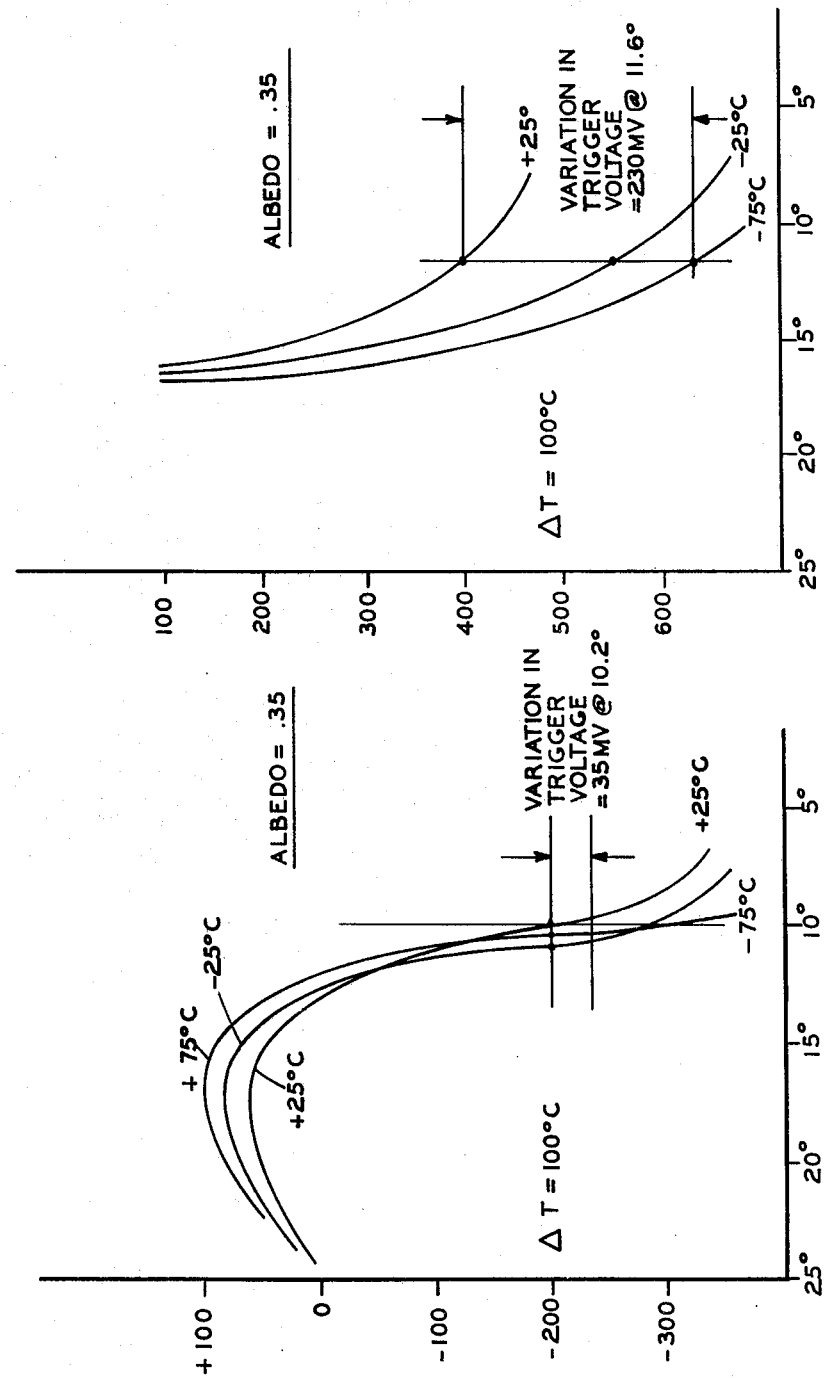

FIGURE 9 is a graphical representation showing earth albedo sensor voltage output variations of a device embodying the present invention at different ambient temperatures over a range of 100 degrees centigrade.

FIGURE 10 is a graphical representation showing earth albedo sensor voltage output variations of a prior device of the type described in the aforenoted U.S. application Ser. No. 572,775.

Figure 11:
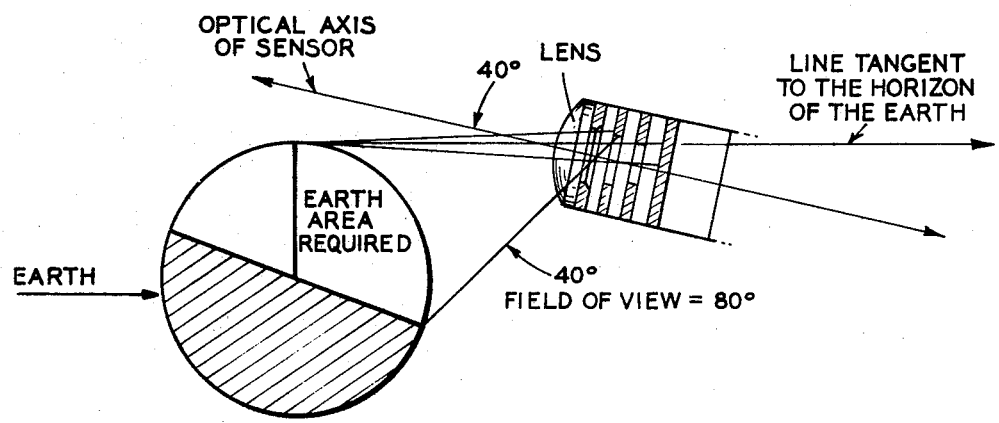

FIGURE 11 is a schematic view which has been distorted to show the image in a wide field of view sensor device of the type such as disclosed and claimed in the copending U.S. application Ser. No. 572,775 upon such a sensor device being at a position wherein the angle $\theta$ is relatively small, i.e., a field of view of 80 degrees.

Figures 1, 2:
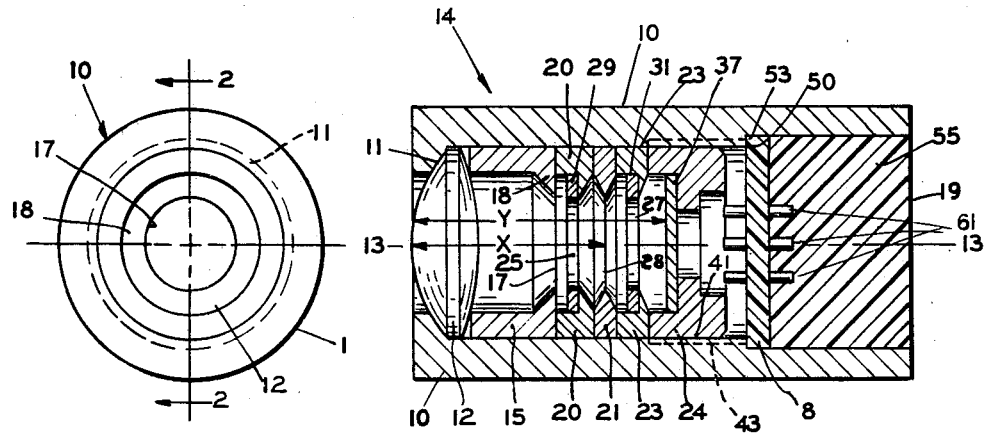
FIGURE 1 is an end view of a light sensing device embodying the present invention and showing the relatively short focal length lens, an apertured front plate, as well as an apertured first photovoltaic cell stop.
FIGURE 2 is a sectional view of the light sensing device of FIGURE 1 taken along the lines 2—2 and looking in the direction of the arrows.
Figure 12:
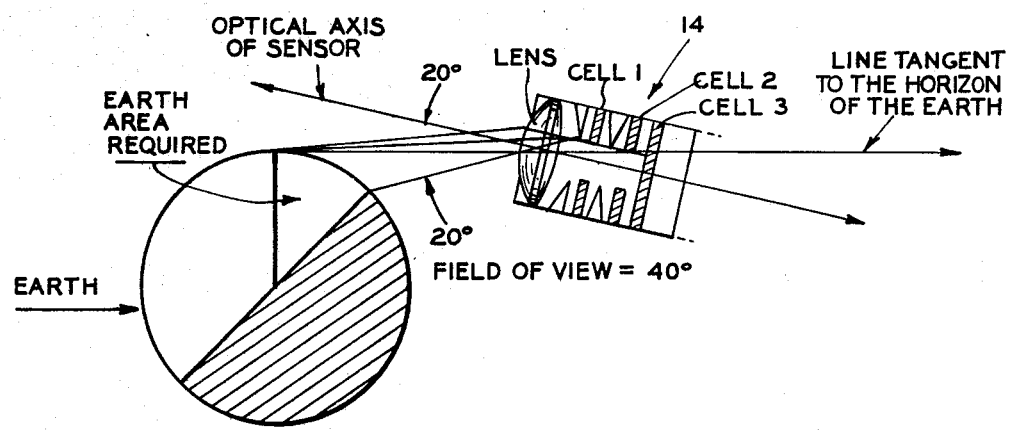

FIGURE 12 is a schematic view which has been distorted to show the image in the sensor device of the present invention of FIGURES 1 and 2 upon the device being at a position where angle $\theta$ is relatively small, i.e., when the optical axis of the light sensing device is about 15 degree off a line tangent to the horizon of the earth and in that respect in a position corresponding to that illustrated in FIGURE 11, but in which position the device of the present invention has a much smaller field of view of 40 degrees.

Thus, as illustrated schematically in FIGURE 12, in the sensor device of the present invention the focal light stop acts as a light energy off-on switch to selectively control the illumination of the succeeding second and third photovoltaic cells so as to provide a trigger angle which has a greater criticality to the angle of the incoming light rays in effecting the off-on illumination of limited edge surfaces of the photovoltaic cells to provide a voltage output therefrom dependent upon the critical angle of the incoming light being such as to strike the controlling limited edge surfaces of the second and third photovoltaic cells, as distinguished from a progressive illumination of the surface area of such photovoltaic cells, as in the prior device of the aforenoted U.S. application Ser. No. 572,775, in which a characteristic variation in the resultant current output is effected upon a change in the intensity of the illumination, as well as the extent of the area of illumination of the surfaces of the photovoltaic cells.

DESCRIPTION OF THE INVENTION

The sensor of the present invention is intended for applications requiring an on/off signal when the sun or illuminated earth falls within its field of view. Applications include sun impingement protection on star trackers where damage to sensitive photocathodes are possible should the sun fall within the field of view of primary optics. In such applications the sensor provides a triggering voltage which may be used to cause a relay mechanism to actuate a light excluding shutter or shield interposed in the primary optical path. The value of this critical triggering voltage may be an arbitrary predetermined value so selected as to fall within the sensor maximum to minimum output and has been shown graphically by FIGURE 7.

Figure 3:
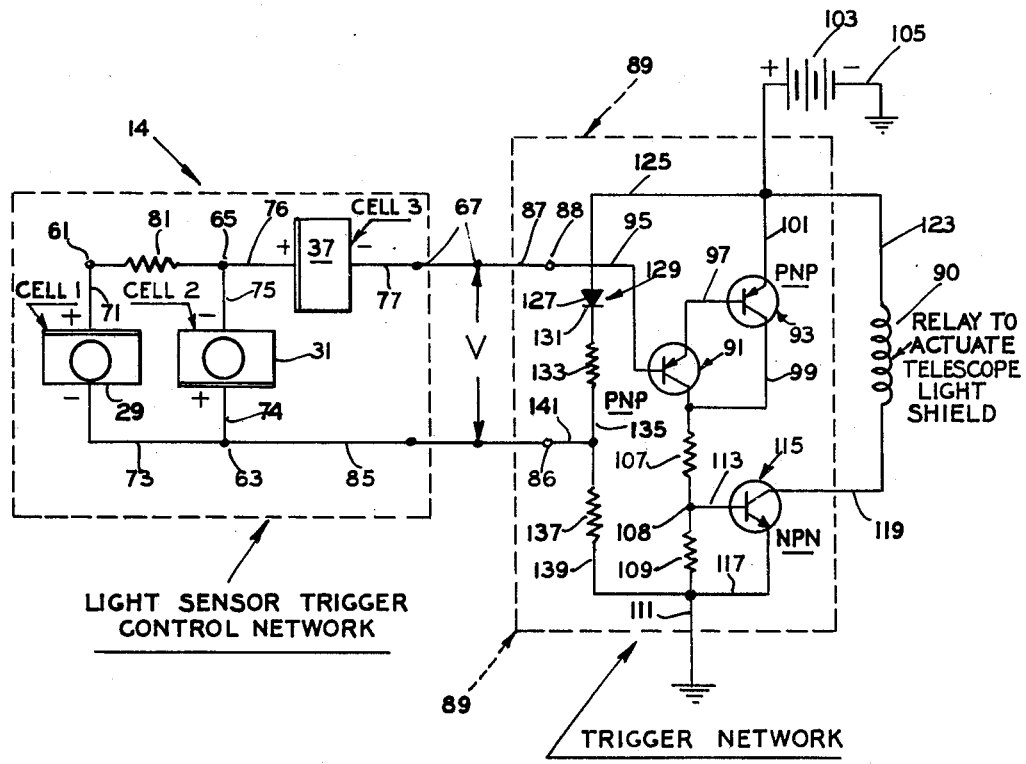
FIGURE 3 is a schematic wiring diagram of an electrical network controlled by the photovoltaic cells of FIGURE 2 and including a light sensor trigger control and a trigger network opearted thereby.

The sensor may be used with a trigger network, of a conventional type, as shown by FIGURE 3, and arranged to operate a suitable shutter solenoid. This trigger network may be packaged in a companion housing to the sensor network and, as shown in FIGURE 3, may include a matched pair of sensor and trigger networks to provide an output switching voltage relatively independent of changes in the prevailing ambient temperature.

Referring to the drawings of FIGURES 1 and 2, there is indicated by the numeral 10, a tubular housing in which there is mounted the several parts of a light sensor 14 embodying the present invention. The housing 10 has an internal annular flange 11 at an open end thereof adjacent to which there is a circular convex lens 12 having a relatively short focal length. Lens 12 may be formed of a pure fused quartz to prevent discoloration in use.

The lens 12 has an optical axis 13 and a relatively short focal length X somewhat shorter than the dimension Y of the interior of the sensor taken along the axis 13. The lens 12 is securely mounted in the open end of the tubular housing 10 at the flange 11 by a suitable cement material. Positioned immediately behind the lens 12, and cemented thereto in position, is a first annular collar 15 having formed therein a circular aperture 17 defined by an internal flange 18 and concentrically positioned in the annular collar 15, in relation to the optical axis 13 of the lens 12. The internal flange 18 and the circular aperture 17 in the collar 15 are so arranged as to provide a first light stop which effects in some degree the trigger angle of the light sensing device, as hereinafter explained in greater detail.

The circular lens 12 and the annular apertured collar 15 are slipped into position through an opposite open end 19 of the tubular member 10 and suitably cemented in position adjacent the internal flange 11, as shown in FIGURE 2. Further, successively positioned adjacent to the annular apertured collar or first light stop 15 is a first annular cell holder 20, an annular apertured collar or second light stop 21, a second circular cell holder 23 and a third annular cell holder 24. The first and second annular cell holders 20 and 23 have circular apertures 25 and 27, respectively, while the first and second annular collars 15 and 21 have circular apertures 17 and 28. All of the circular apertures 17, 25, 27 and 28 are of the same diameter and are concentrically positioned in relation to the optical axis 13 of the lens 12. The cell holders 21 and 23 are arranged to carry, respectively, silicon photovoltaic cells 29 and 31. The photovoltaic cell 29 has a circular aperture of the same diameter as that of the circular aperture 17 in the plate 15, as well as of the same diameter as that of the circular aperture 25 in the cell holder 20.

The photovoltaic cell 31 has a circular aperture 35 which is of the same diameter as the circular aperture of the photovoltaic cell 29. The circular apertures of the respective cells 29 and 31 are concentrically arranged in relation to the optical axis 13 of the lens 12.

The cell holder 24 carries a non-apertured silicon photovoltaic cell 37, and further has provided in a circumferential edge thereof suitable screw threads 41, as shown in FIGURE 2, adapted to screw threadedly engaged in internal screw threads provided at 43 within the tubular member 10.

The cell holders 20 and 23 are thus assembled in the tubular member 10 by the cell holder 23 which in turn has the threads 41 thereon screw threadedly engaged in the internal screw threads 43 of the tubular member 10 and the assembly tightened into position, as shown by FIGURE 2.

There is then positioned in the tubular member 10, a circular disc or terminal plate 50, formed of suitable electrical insulating material and positioned immediately adjacent an annular internal flange 53 provided within the tubular member 10. Suitable epoxy material 55 is then placed in the tubular member 10 to hold the terminal disc 50 in position, as shown in FIGURE 2.

As best shown in FIGURES 2 and 3, the terminal disc 50 has mounted thereon suitable electrical terminals 61, 63, 65 and 67. The electrical terminal 61 is connected through an electrical conductor 71 to the positive terminal of the photovoltaic cell 29 while the negative terminal of the cell 29 is connected by an electrical conductor 73 to the electrical terminal 63. The electrical terminal 63 is also connected by an electrical connector 74 to the positive terminal of the photovoltaic cell 31 which has its negative terminal connected by an electrical conductor 75 to the electrical terminal 65. The electrical terminal 65 is also connected through an electrical conductor 76 to the positive terminal of the photovoltaic cell 37 which has its negative terminal connected through an electrical conductor 77 to the electrical terminal 67.

It will be further seen from the wiring diagram of FIGURE 3, that there is connected between electrical terminals 61 and 65, a variable balancing resistor 81, having a negligible temperature coefficient or one that is slightly positive. The resistor 81 may be adjusted or so selected as to set the effective trigger value region of the device with respect to the angle $\theta$ or the angular degree of the optical axis of the light sensing device off a line extending tangent to the horizon of the earth, as has been shown by the graphical illustration of FIGURE 7, and from which it may be seen that the effective trigger value region with respect to the angular degrees off tangent of the optical axis 13 of the light sensitive device 14 increases in direct relation to the resistance of the calibrating resistor 81. Thus there may be set by the resistor 81, the value of the trigger voltage to be applied across output conductor 85 and 87, which lead, respectively, from the terminals 63 and 67, to input terminals 86 and 88 of a trigger network 89, as shown by FIGURE 3.

The trigger network 89 may be of a conventional type and is effective upon the input terminal 88 exceeding a predetermined negative value relative to the input terminal 86 to trigger the electrical energization of a relay winding 90 to actuate a light shield or shutter operating mechanism for closing a star tracker telescope carried by the space vehicle in orbit about the earth.

From the electrical network shown in FIGURE 3, it will be seen that upon the photovoltaic cell 29 being the only cell illuminated, the output signal, as shown graphically by FIGURE 7, will be positive at the terminal 67 with respect to the electrical terminal 63, which will be negative. However, as the photovoltaic cells 31 and 37 become illuminated, output voltage from cell 31 is sufficient at resistor 81 to nullify the effect of the photovaltaic cell 29, and both cells 31 and 37 cause, as shown graphically by FIGURE 7, a sharp reversal in the polarity of the output signal at terminals 67 and 63 changing from positive to negative with respect to the output voltage at the electrical terminal 63 which now becomes positive. The role of the selected resistor 81 is to shape the curve and set the trigger angle, as illustrated graphically in FIGURE 7. Moreover, the trigger network 89 is so arranged that only upon the output terminal 67 becoming sufficiently negative with respect to terminal 63 as to reach the trigger voltage value, shown graphically in FIGURE 7, at the predetermined angular degree of the optical axis 13 of the light sensing device 14 off the tangent is the electromagnetic winding 90 thereupon effectively energized to cause actuation of the light shield or shutter of the telescope of the closed position to prevent damage to the telescope by excessive light rays.

Consider now the light sensor device of FIGURES 1 to 3, mounted on a space vehicle, and the space vehicle in orbit about the earth. Then consider FIGURE 12 which shows the sunlit earth, and the light sensitive device 14 in relation to each other. Their relative sizes and separations have been distorted in order to help clarify the functional operation of the device.

Reflected sunlight from the earth enters the short focal length lens 12 and strikes the light sensitive elements which are designated cell #1, Cell #2 and Cell #3 in FIGURE 12 and which correspond to the photovoltaic cells 29, 31 and 37 of FIGURES 2 and 3.

When the device is in operation as in FIGURE 12, we may assume a prior starting position. Thus, in order to start the operational description, assume that the device is facing or pointing to a section of the empty sky or empty space so that neither direct sunlight nor the reflected sunlight from the earth can enter the field of view of the lens 12, as shown, for example, by FIGURE 4. Then assume that the satellite on which the sensor is mounted slowly turns in space so that the optical axis 13 of the sensor 14 moves towards the earth and reflected sunlight from the earth begins to enter the lens 12, as shown, for example, by FIGURE 5. FIGURES 5 and 12 show the optical axis 13 of the sensor 14 still sufficiently far from a line tangent to the horizon of the earth so that reflected sunlight from the earth, entering the lens 12, can only strike Cell #1, corresponding to photovoltaic cell 29, as shown in FIGURE 2. Cell #1 causes the sensor terminal 67 to yield a positive electrical output for positions in space where the optical axis 13 of the sensor 14 lie, for example, between 20 and 25 degrees off the line extending tangent to the horizon of the earth. The Cell #1 output upon the light sensor device 14 being in the position shown by FIGURES 5 and 12 provides a positive output at the terminal 67.

Now as the optical axis of the light sensor device 14 moves closer to the line extending tangent to the horizon of the earth upon the space satellite turning, some of the reflected earth image light will at the focal point of the lens 12 be diverged and intercepted by the Cell #2 corresponding to the photovoltaic cell 31, as well as by the cell 3 corresponding to the photovoltaic cell 37 whereupon the voltage output from cell 31 and cell 37 will now act so as to rapidly counterbalance the output voltage of the photovoltaic cell 29 or Cell #1 so that the positive output characteristic at the terminal 67 of FIGURE 11 thereupon begins to rapidly decrease and go negative as the angle $\theta$ between the optical axis of the light sensor device and the line tangent to the horizon of the earth decreases below the critical angle. As the angle $\theta$ becomes smaller, decrease below, for example, 15 degrees and approaches the critical 12 degree range, diverging image light at the focal point X begins to strike the photovoltaic cell 37 or Cell #3 which further enhances the output of Cell #2 (see FIGURES 6 and 7) so as to yield an even larger negative signal output at the terminal 67. The negative signal continues to increase and reaches a maximum value when the optical axis of the device is at an angle within the critical trigger voltage range.

Since the light sensing device 14 is built with rotational symmetry about the optical axis 13 the azimuthal position of the sun or earth does not effect the output signal from the sensor 14. At a predetermined angular relation of the optical axis 13 of the sensor devcie 14 with that of the line extending tangent to the horizon of the earth, as shown schematically at FIGURE 6 and graphically at FIGURE 7, the negative bias applied at the output terminal 67 and through conductor 87 to the input conductor 88 of the trigger network is increased to a sufficient value to trigger the operation of the trigger network 89 and cause the energization of the electromagnetic winding 90 to thereupon effect the actuation of the light shield or shutter mechanism of the star tracking telescope carried by the satellite, as heretofore explained.

A typical trigger network, such as shown in the aforenoted U.S. application Ser. No. 572,775 and which may be made temperature insensitive by conventional means, has been indicated by the numeral 89 and may be utilized, as shown in FIGURE 3.

In the present application, the effects of changes in the ambient temperature have been minimized in the light sensor trigger control network of FIGURES 1, 2 and 3 so that the control is relatively temperature insensitive, as indicated graphically by FIGURE 9, in which changes over a range of 100 degrees centigrade will cause minimum variations in the sensor voltage output of only 35 millivolt change, while in the prior device as shown graphically by FIGURE 10, such changes in temperature over the range of 100 degrees centigrade will cause a variation in sensor output of as large as 230 millivolts.

The trigger network 89 as thus described and shown in FIGURE 3, will be effective to trigger the energization of electromagnetic winding 90, upon the negative voltage applied at terminal 67, exceeding a predetermined value which, as shown graphically in FIGURE 7, will be effective upon the optical axis 13 of the sensor device being at a position corresponding to the angle $\theta$ or at a predetermined critical angular degree off the tangent.

While prior earth albedo sensor devices have been based in the operation thereof on a constant earth albedo (coefficient of reflectance) of, for example, .35, it must be borne in mind that the earth albedo sensor may be required to effect closure of a shutter, to protect a photomultiplier tube from damage, when the angle of the optical axis to the earth's zenith is at a predetermined value irrespective of variations in the earth albedo. Under actual operating conditions, the earth's albedo may vary from .1 to .85, which may seriously affect the operation of the prior type sensor trigger angle so that, for example, under low illumination conditions, it may not function while under high illumination conditions it may trigger under undesirable conditions. It was therefore an object of the invention to provide a sensor device that would perform within specific angular tolerances to a wide variation of incoming light intensity or variable albedo conditions so as to be less sensitive to earth albedo area variations caused by eclipsing, and further be relatively temperature insensitive over a wide range.

This was accomplished in the present invention by incorporating a short focal length lens 12 in lieu of the standard optical window concept of the prior device, a focal plane stop 21 acting as an off-on illumination switch to increase device sensitivity, and other stops 11 and 15 to limit the effective areas of the photovoltaic cells exposed to the controlled illumination to balance the energy densities that may selectively impinge on the three photovoltaic cells 29, 31 and 37 at said limited effective areas.

The device consists of a housing 10, lens 12, three voltaic cells 29, 31 and 37, aperture stops 11, 15 and 21, and a balance resistor 81 (FIGURE 3) for the light sensor trigger control network. Light enters the lens 12 whose aperture is controlled by the housing opening (stop 11) and travels past stop 15. Stop 15 limits the surface area of cell 29 exposed to the incoming lightt rays. The remaining light converges at its focal point in the plane of stop 21 and diverges on to the limited edge surfaces of the second and third photovoltaic cells 31 and 37. Stops 15 and 21 and the voltaic cells 31 and 37 are positioned in space relation at the proper distance from the lens 12. Stops 16 and 21 and voltaic cells 29 and 31 have the same hole diameters so as to simplify the optical axis alignment. The electrical schematic is depicted by FIGURE 3.

Figure 4:
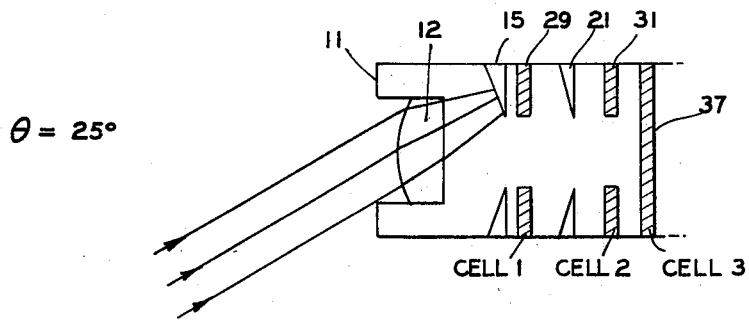
FIGURES 4, 5 and 6 are a schematic illustration of the operation of the light sensor device of FIGURE 2 upon the incoming light rays being at the indicated angles of 25 degrees, 15 degrees and 12 degress, respectively, and showing that upon a critical angle of the incoming light rays passing, for example, from the 15 degree angle to the critical 12 degree angle, as illustrated, respectively, by FIGURES 5 and 6, the triggering action is effected.
Figure 5:
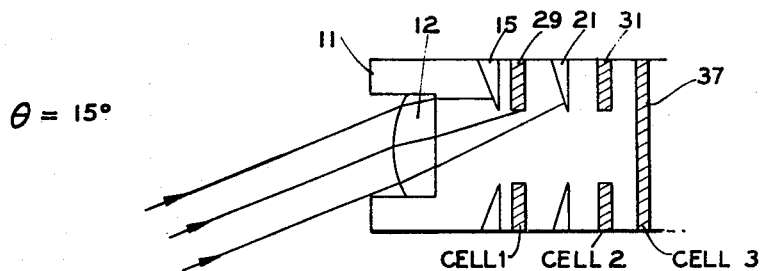
Figure 6:
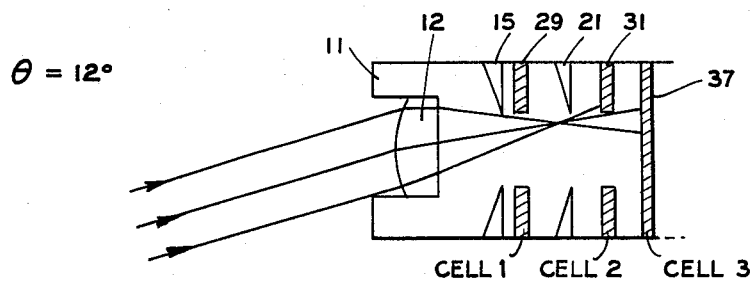

FIGURES 4, 5 and 6 show the light ray paths for three angles of incidence. Light that enters the lens at a large angle (FIGURE 4) is prohibited from impinging on the photovoltaic cells 31 and 37 by the light stop 15. The photovoltaic cells 29, 31 and 37 generate output voltages as a function of the selective illumination thereof, as distinguished from current as a function of the illumination of variable surface areas of the cells as in the prior device.

A second function of the light stop 15 is to limit the exposed area of cell 29 subject to selective illumination so as to reduce its current generating capability. This reduces the capability of cell 29 to vary the sensor current output with varying illumination.

FIGURE 5 shows a small limited amount of light energy impinging on the photovoltaic cell 29 and the remaining energy focused on stop 21. This angle of incidence results in a positive voltage output from cell 29. Stop 21 is located at the lens focal point where the beam of incoming energy is smallest. In this location, it acts as a light energy off-on switch to cells 31 and 37. Thus small angular changes of the incident light angle results in a rapid change of negative voltage generated by cells 31 and 37, relative to a positive voltage by the photovoltaic cell 29. FIGURE 6 and the graph of FIGURE 7 display this feature. The graph of FIGURE 8 on the other hand is representative of the output characteristics of a prior sensor device and from which it can be seen that the trigger angle varies greatly with the earth albedo or intensity of illumination (9.1° change from .2 to .75 albedo). The advantages in the operation of the variable albedo earth sensor of the present invention over that of the prior device are shown on the graph of FIGURE 7 (2.2° change from .2 to .7 albedo).

Attention is directed to the following features which have been described above.

(1) Short focal length lens 12 to increase cell light intensity.

(2) Use of critical stops 11, 15 and 21 to increase rapidity of light transfer and device sensitivity.

(3) Balance voltage outputs of cells 29, 31 and 37 to minimize output voltage changes caused by a varying albedo.

(4) Balance voltage outputs of cells 29, 31 and 37 to minimize output voltage changes caused by temperature variations.

It will be seen from the foregoing that there has been provided in the present invention a light sensing device 14 utilizing a plurality of aperatured stops 11, 15 and 21, photocells 29, 31 and 37, together with a relatively short focal length lens 12 operable for sensing with greater accuracy the angular relationship of the optical axis of the device to that of a line extending tangent from the horizon of the earth under varying earth albedo conditions and a device responsive to the extent of reflected light rays transmitted thereto from the earth, together with a novel electrical sensor network for setting the critical angle at which there is effected an output trigger voltage.

While only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. An electro-optical apparatus comprising a light ray angle sensing means including a lens having a relatively short focal length and an optical axis extending in angular relation to the incoming light rays, a plurality of photovoltaic cells positioned along the optical axis in spaced relation one to the other and to said lens, a first of said photovoltaic cells being positioned a distance from said lens within the focal length thereof and other of said cells being at a greater distance from said lens than the focal length thereof, light stop means having a control opening at the focal plane of the lens and effective upon the angular relation of the incoming light rays to said optical axis being within a critical range to permit the light rays converging at the focal point of the lens to diverge through the control opening of the stop means so as to selectively illuminate the other of said photovoltaic cells with said diverging light rays, and said stop means being effective to prevent the diverging light rays from illuminating said other cells upon the angular relation of the light rays to said optical axis being out of the critical range, the first of said photovoltaic cells providing upon the selective illumination thereof a first electrical output voltage, the other of the photovoltaic cells providing a second electrical output voltage upon the selective illumination thereof by said diverging light rays, said second electrical output voltage acting in opposition to the first electrical output voltage, and means for providing a resultant difference in said first and second voltages as an electrical output voltage of a polarity dependent upon whether the angular relation of the incoming light rays to the optical axis of the lens is within said critical range.

2. An electro-optical apparatus in accordance with claim 1 including the first photovoltaic cell and one of said other photovoltaic cells being serially connected in an electrical loop network including a balance resistor, the first photovoltaic cell and said one other photovoltaic cell providing output voltages acting in opposition across said balance resistor, electrical output conductors for applying a resultant difference in said output voltages, one of said electrical output conductors including another of said other photovoltaic cells providing an output voltage acting in opposition to the output voltage from said first photovoltaic cell so as to effect a resultant output voltage across said output conductors of a polarity dependent upon whether said angular relation of the incoming light rays to the optical axis of the lens is within the critical range.

3. An electro-optical apparatus in accordance with claim 1 in which the light ray angle sensing means includes a tubular housing, the lens being mounted in an open end of said tubular housing, a first collar having a circular apertures and positioned in said housing adjacent to said lens, a plurality of photovoltaic cells mounted in said tubular housing in successive order and in a spaced relation one to the other at least a pair of said photovoltaic cells having circular apertures therein, said stop means including a second collar having a circular aperture positioned in said housing at the focal plane of the lens, the optical axis of the lens extending in concentric relation to said circular apertures, the first apertured cell being positioned in said tubular housing intermediate said first apertured collar and another of said apertured photovoltaic cells, and the circular apertures of said cells having diameters equal to that of the circular apertures of said first and second collars so as to restrict areas of said first cell and the other of said cells that may be exposed to illumination by the incoming light rays, passage of said light rays to said photovoltaic cells through said apertures being effectively controlled by the angular relation of the optical axis of the lens to the incoming light rays so as to effect a selective off-on illumination of the other of said photovoltaic cells.

4. An electro-optical apparatus in accordance with claim 3 including the first photovoltaic cell and said other of said cells being serially connected in an electrical loop network including a balance resistor so as to provide upon the selective illumination of said first cell and the other of said cells output voltages of opposite polarity acting in opposition across said balance resistor, and electrical output conductors connected across said loop network for applying a resultant difference in said output voltage and another of said other cells providing upon the selective illumination thereof an output voltage acting with the output voltage from the second cell and dependent upon the angular relation of the incoming light rays to the optical axis of the lens.

5. An electro-optical apparatus in accordance with claim 1 in which the light ray angle sensing means includes a tubular housing, the lens being mounted in an open end of said tubular housing, a first collar having a circular aperture and positioned in said housing adjacent to said lens, a plurality of photovoltaic cells mounted in said tubular housing in successive order and in spaced relation one to the other said photovoltaic cells including a first photovoltaic cell having a circular aperture therein, a second photovoltaic cell having a circular aperture therein, and a third photovoltaic cell, said stop means including a second collar having a circular aperture positioned at the focal plane of the lens and intermediate the first and second cells, said lens having an optical axis extending in concentric relation to said circular apertures, the circular apertures of said first and second photovoltaic cell having diameters equal to that of the diameters of the circular apertures of said first and second collars so that surface areas of the first and second photovoltaic cells exposed to the incoming light rays may be so restricted as to provide a balanced output voltage of opposite polarity upon the selective illumination thereof and the passage of light rays to said photovoltaic cells through said apertures may be effectively controlled by the angular relation of the optical axis of the lens to the incoming light rays so as to effect a selective off-on illumination of the second and third photovoltaic cells.

6. An electro-optical apparatus in accordance with claim 5 in which the second apertured collar interposed between the first and second photovoltaic cells effects an off-on control of the divergence of the incoming light rays to the second and third photovoltaic cells.

7. An electro-optical apparatus in accordance with claim 6 including a balancing resistor, the first and second photovoltaic cells being serially connected with the balancing resistor in an electrical loop network, the first photovoltaic cell providing upon the selective illumination thereof a first output voltage, the second photovoltaic cell providing upon the selective illumination thereof a second output voltage, the first and second output voltages acting in opposition across said balancing resistor, a pair of electrical output conductors, one of said electrical output conductors leading from a point between said serially connected balancing resistor and said second photovoltaic cell, and the other of said electrical conductors leading from a point between said first and second serially connected photovoltaic cells, said one electrical output conductor including the third photovoltaic cell providing upon the selective illumination thereof a third output voltage acting in opposition to the output voltage from said first photovoltaic cell to effect a resultant difference in said output voltages applied through said output conductors as an electrical output voltage of a polarity dependent upon said angular relation of the incoming light rays to the optical axis of the lens.

8. An electro-optical apparatus in accordance with claim 3 in which the other of said photovoltaic cells includes second and third photovoltaic cells, the first and second photovoltaic cells having circular apertures of equal diameter, and the circular apertures of the first and second collars being of equal diameter to that of the circular apertures of the first and second photovoltaic cells, all of the circular apertures being arranged in concentric relation to the optical axis of the lens so that the passage of light rays to said photovoltaic cells through said apertures may be effectively controlled by the angular relation of the optical axis of the lens to the light rays so as to selectively effect an off-on illumination of said second and third photovoltaic cells.

9. An electro-optical apparatus in accordance with claim 8 including a balancing resistor, the first and second photovoltaic cells being serially connected with the resistor in an electrical loop network, the first, second and third photovoltaic cells providing upon the selective illumination thereof electrical output voltages, the electrical output voltages of the first and second cells acting in opposition to provide a resultant differential voltage, and electrical output conductors for applying the resultant difference in said first and second output voltages as an electrical output voltage, and the third photovoltaic cell providing an output voltage acting in additive relation to the output voltage of said second cell and in a sense dependent upon the angular relation of the incoming light rays to the optical axis of the lens.

10. A photoelectric device comprising a tubular body member, a lens mounted in an open end of said member and having a focal length less than a length of said tubular member, a plurality of photosensitive members positioned in spaced relationship within said tubular body member and transverse to a common axis along which activating radiation from an external source may pass, one of said photosensitive members being positioned in said tubular body member a distance from said lens less than the focal length thereof, and other of said photosensitive members being positioned in said tubular body member greater distances from said lens than the focal length thereof, radiation stop means positioned in said tubular body member at a focal plane of said lens, said radiation stop means having an aperture therein through which the activating radiation selectively diverges to the other of said photosensitive members upon the angular relation of the common axis to the radiation from said external source being within a critical angular range.

11. The combination defined by claim 10 including an electrical network controlled by the selective activation of said photosensitive members, and balancing means to set the electrical network so as to effect an electrical output signal voltage therefrom to provide a control function upon the angular relation of the common axis to the radiation from said external source decreasing to less than a critical angular range set by said balancing means.

12. For use on a space vehicle, a photoelectric device as defined by claim 11 in which the common axis may extend in an angular relation to variable albedo radiations from the earth, and the stop means effecting a selective off-on activation of said photosensitive members to control the electrical network.

References Cited

UNITED STATES PATENTS

| | | | |
|---|---|---|---|
| 3,218,909 | 11/1965 | Fain | 88—1 |
| 3,230,378 | 1/1966 | Hooker | 250—203 X |

JAMES W. LAWRENCE, Primary Examiner

E. R. LA ROCHE, Assistant Examiner

U.S. Cl. X.R.

250—83.3; 237